United States Patent
Papanikolaou et al.

(10) Patent No.: US 9,783,028 B1
(45) Date of Patent: Oct. 10, 2017

(54) POWERED DUAL CLOSURE SYSTEM FOR VEHICLES

(71) Applicant: Ford Global Technologies, LLC, Dearborn, MI (US)

(72) Inventors: Kosta Papanikolaou, Huntington Woods, MI (US); Donald P. Iacovoni, Plymouth, MI (US); Paul L. Heirtzler, Jr., Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/071,649

(22) Filed: Mar. 16, 2016

(51) Int. Cl.
*B60J 5/02* (2006.01)
*B60J 5/10* (2006.01)

(52) U.S. Cl.
CPC ............... *B60J 5/104* (2013.01); *B60J 5/106* (2013.01)

(58) Field of Classification Search
CPC .................................. B60J 5/104; B60J 5/106
USPC .... 296/50, 51, 55.56, 146.8, 146.11, 146.12, 296/146.13, 76
See application file for complete search history.

(56) References Cited

U.S. PATENT DOCUMENTS

| | | | |
|---|---|---|---|
| 4,413,854 A | 11/1983 | Hirshberg | |
| 4,688,844 A * | 8/1987 | Hirose | B60J 5/101 296/106 |
| 6,007,139 A * | 12/1999 | Shave | B60J 5/101 296/146.8 |
| 6,174,015 B1 * | 1/2001 | Shave | B60J 5/101 296/55 |
| 6,454,341 B2 * | 9/2002 | Tolinski | B60J 1/1861 296/106 |
| 6,901,704 B2 * | 6/2005 | Sakaue | E05F 15/63 296/56 |
| 7,128,362 B2 * | 10/2006 | Telehowski | B60J 7/20 296/107.08 |
| 7,631,921 B2 | 12/2009 | Lewis et al. | |
| 8,174,146 B2 | 5/2012 | Cheal et al. | |
| 8,376,449 B2 * | 2/2013 | Kitayama | B60J 1/1869 296/146.8 |
| 9,067,626 B1 | 6/2015 | Anderson | |
| 2015/0376929 A1 * | 12/2015 | Scheuring | E05F 15/622 74/89.38 |

FOREIGN PATENT DOCUMENTS

| | | |
|---|---|---|
| DE | 4400374 A1 | 7/1995 |
| DE | 102006013735 A1 | 10/2006 |
| EP | 0718134 B1 | 6/1996 |
| EP | 1652708 A1 | 5/2006 |

(Continued)

OTHER PUBLICATIONS

Citroenet, "Citroen C2 Ingenious and Practical," 2003, 3 pages.

*Primary Examiner* — Pinel E Romain
(74) *Attorney, Agent, or Firm* — Jason Rogers; Price Heneveld LLP (57) ABSTRACT

A vehicle closure including a rotatable lift gate and a decklid that is rotatably connected to the liftgate. First and second electrically powered actuators provide powered opening and powered closing of the liftgate and the decklid, respectively. The first powered actuator locks to prevent movement of the liftgate when the second powered actuator is actuated, and the second powered actuator locks to prevent movement of the decklid when the first powered actuator is actuated.

20 Claims, 5 Drawing Sheets

(56) References Cited

FOREIGN PATENT DOCUMENTS

| | | |
|---|---|---|
| GB | 2462662 B | 2/2010 |
| JP | 4051737 B2 | 2/2008 |
| WO | 2009109147 A1 | 9/2009 |
| WO | 2009109149 A1 | 9/2009 |

* cited by examiner

FIG. 7

POWERED DUAL CLOSURE SYSTEM FOR VEHICLES

FIELD OF THE INVENTION

The present application generally relates to motor vehicles including dual gates, and in particular to a powered closure system that selectively locks a decklid panel in a closed position relative to a vehicle body, and a powered closure hinge that selectively locks a decklid panel to the liftgate panel.

BACKGROUND OF THE INVENTION

Various types of dual gate vehicle closures have been developed to close off a trunk/rear hatch opening of a vehicle. Typically, dual closures for vehicles include a liftgate panel that is movably mounted to a vehicle body, and a decklid panel that is movably mounted to the liftgate panel. The decklid panel can be opened by itself in a manner that is somewhat similar to a conventional trunk lid. The decklid panel and the liftgate panel can also be opened together in a manner that is somewhat similar to that of a conventional rear hatch of a hatchback. However, known systems may suffer from various drawbacks.

SUMMARY OF THE INVENTION

One aspect of the present disclosure is a dual closure system for vehicles including a liftgate panel having a first hinge at a first or front edge that is configured to movably connect the liftgate panel to a vehicle body adjacent to an access opening in the vehicle body. The liftgate panel includes a second or rear edge that is opposite the first/front edge. A decklid panel is pivotably connected to the liftgate panel adjacent the second/rear edge thereof by a lid hinge. The system further includes a first powered actuator that is configured to provide powered rotation of the liftgate panel in a first direction about the first hinge to thereby open the liftgate panel. The first powered actuator is also configured to provide powered rotation of the liftgate panel in a second direction about the first hinge to close the liftgate panel. The system further includes a second powered actuator that is configured to provide powered rotation of the decklid panel in a first direction about the lid hinge to open the decklid panel relative to the liftgate panel. The second powered actuator is also configured to provide powered rotation of the decklid panel in a second direction about the lid hinge to close the decklid relative to the liftgate panel. The first powered actuator locks the liftgate panel in a closed position about the first hinge when the second powered actuator is actuated to open the decklid. The second powered actuator selectively locks the decklid panel in a closed position about the lid hinge when the first powered actuator is actuated to open the liftgate panel.

Another aspect of the present disclosure is a vehicle closure including a rotatable lift gate and a decklid that is rotatably connected to the liftgate. First and second electrically powered actuators provide powered opening and powered closing of the liftgate and the decklid, respectively. The first powered actuator locks to prevent movement of the liftgate when the second powered actuator is actuated, and the second powered actuator locks to prevent movement of the decklid when the first powered actuator is actuated.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
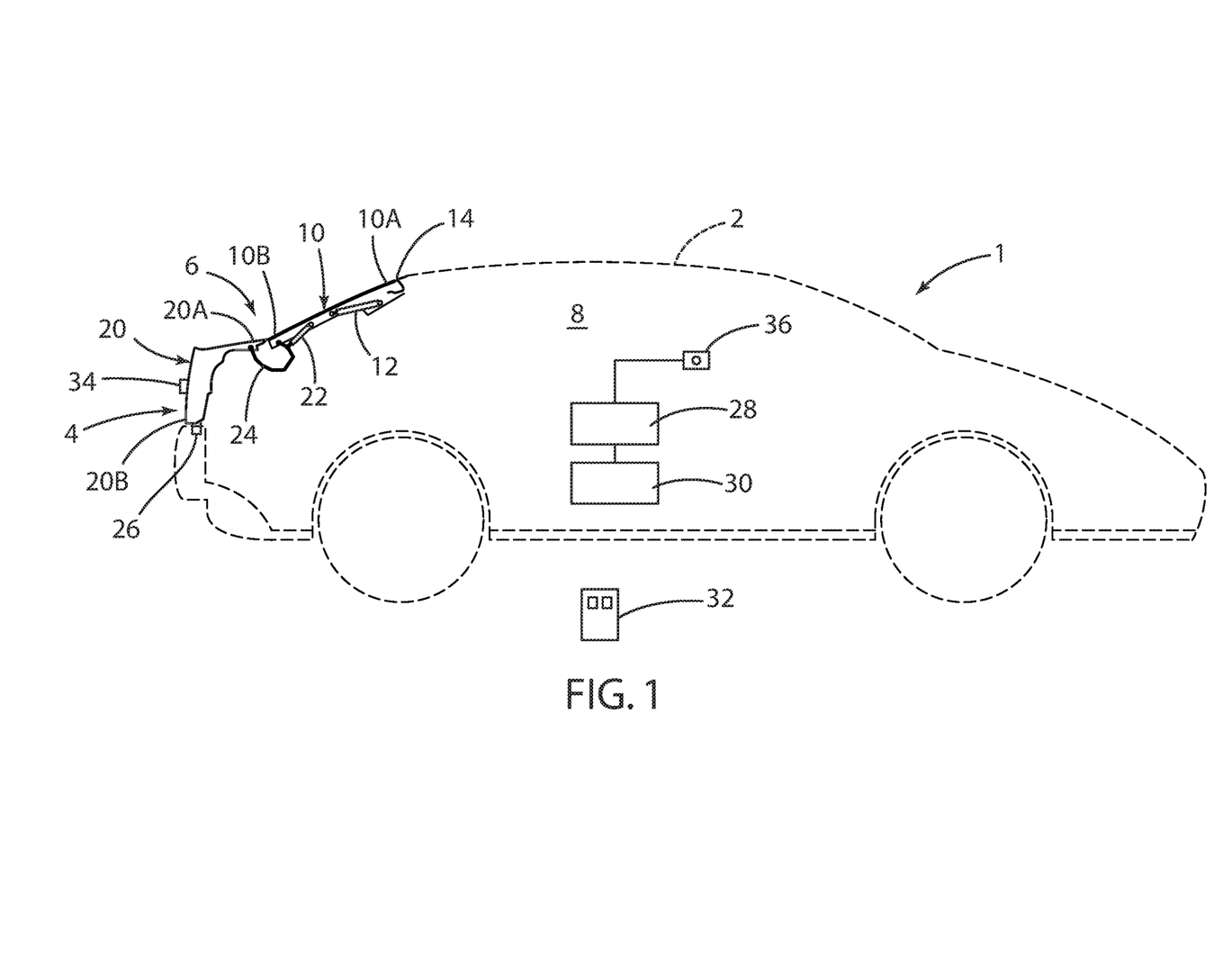
FIG. 1 is a partially schematic side elevational view of a vehicle including a dual gate enclosure having powered lockouts for a decklid panel and a liftgate panel.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 4:
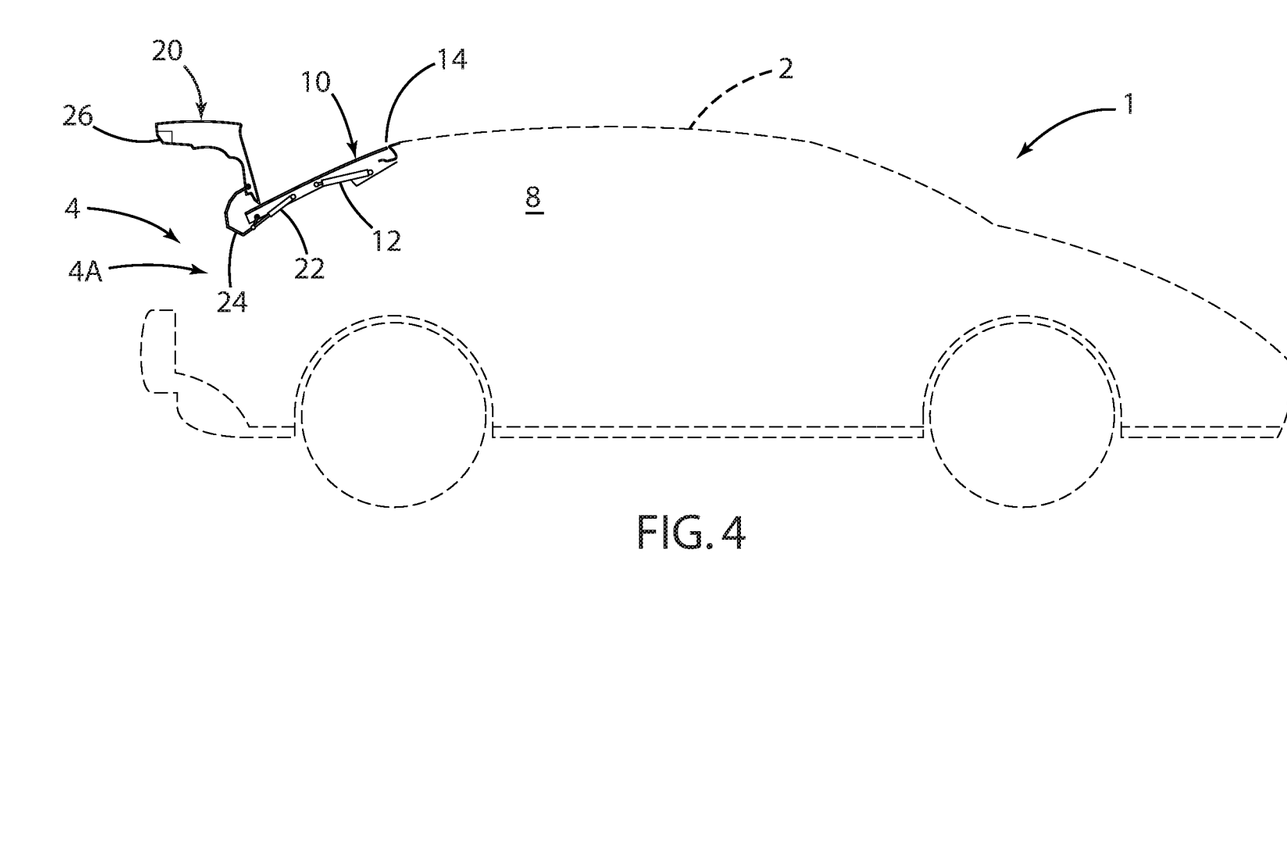
FIG. 4 is a partially schematic side elevational view of the vehicle of FIG. 1 showing the decklid panel in an open position.
Figure 6:
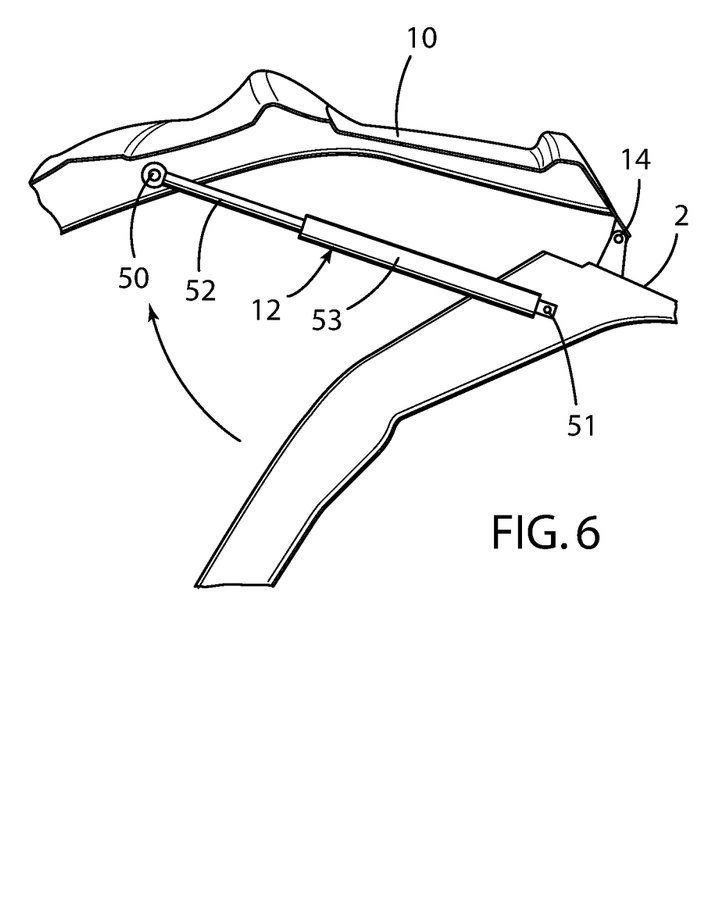
FIG. 6 is a partially fragmentary isometric view showing the decklid panel of FIG. 5.
Figure 7:
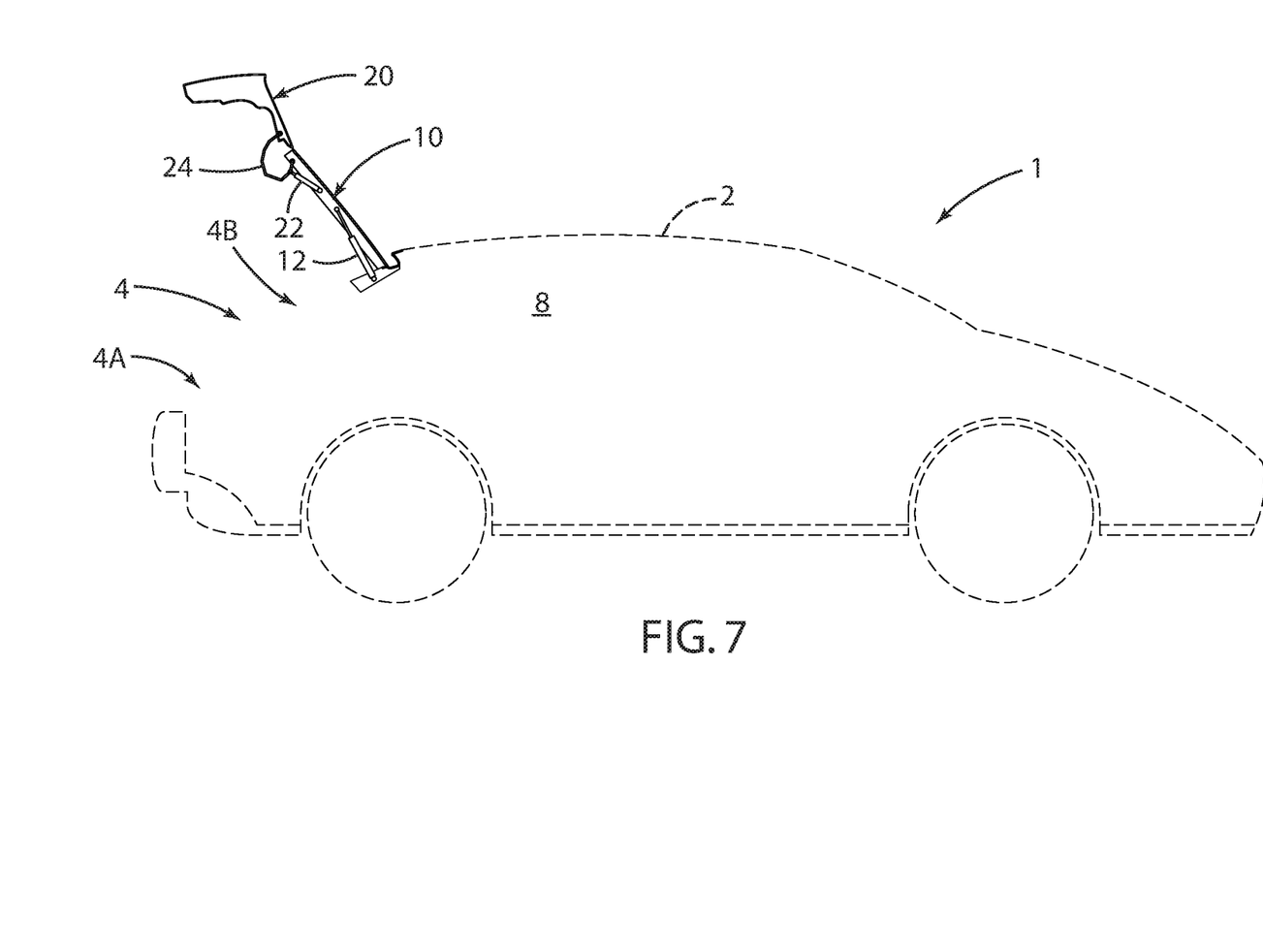
FIG. 7 is a partially schematic side elevational view of the vehicle of FIG. 1 showing the liftgate panel in an open position.

With reference to FIG. 1, a vehicle 1 includes a body structure 2 having a rear access opening 4 that may be selectively closed off by a dual gate assembly 6. Dual gate assembly 6 includes a comprising a liftgate panel 10 and a decklid panel 20. As discussed in more detail below, the decklid panel 20 can be opened while the liftgate panel 10 remains in a closed position to provide access to vehicle interior 8 through a first/lower portion 4A of rear access opening 4 as shown in FIG. 4. The liftgate panel 10 and decklid panel 20 may also be opened together as a unit (FIG. 6) to provide access to vehicle interior space 8 through both first and second portions 4A and 4B, respectively, of opening 4. Liftgate panel 10 is rotatably mounted to the body structure 2 by a first hinge 14. Hinge 14 may rotatably connect a first or front edge portion 10A of liftgate panel 10 to body structure 2. A first or front edge portion 20A of decklid panel 20 is rotatably connected to a second or rear edge 10B of liftgate panel 10 by a second or lid hinge 24. Lid hinge 24 may include stop surfaces that limit rotation of decklid panel 20 relative to liftgate panel 10 such that decklid panel 20 cannot rotate downwardly past the closed position when liftgate panel 10 is in an open position (FIG. 7). A latch mechanism 26 adjacent second edge portion 20B of decklid panel 20 selectively engages vehicle body structure 2 and latches the decklid panel 20 to the vehicle body structure 2. A first powered strut or actuator 12 is configured to rotate liftgate panel 10 from a closed position (FIG. 1) to an open position (FIG. 6). The first powered actuator 12 also provides powered rotation of liftgate panel 10 from the open position (FIG. 6) back to the closed position (FIG. 1).

A second powered strut or actuator 22 provides for powered rotation of decklid panel 20 relative to liftgate panel 10 from a closed position (FIG. 1) to an open position (FIG. 4). The second powered actuator 22 also provides powered rotation of decklid panel 20 from the open position (FIG. 4) to the closed position (FIG. 1). The powered actuators 12 and 22 may be operably connected to a vehicle controller 28 and power supply 30 by electrical lines (not shown). Similarly, latch mechanism 26 may comprise a powered latch that is also operably connected to the controller 28 and power supply 30. The powered actuators 12 and 22, and latch mechanism 26 may be actuated utilizing a wireless remote fob 32, exterior input features such as one or more exterior buttons 34 located on or adjacent decklid panel 20, and/or interior inputs such as interior buttons 36. Fob 32 and buttons 34 and 36 permit a user to selectively actuate the powered actuators 12 and 22 as required to open panels 10 and 12.

Figure 2:
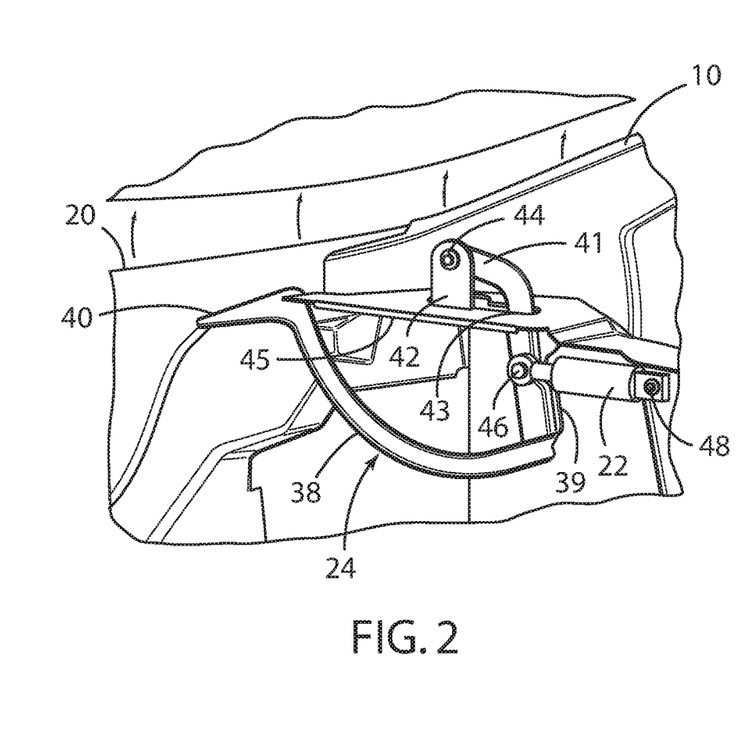
FIG. 2 is a partially fragmentary isometric view showing the decklid panel and liftgate panel of FIG. 1.

With further reference to FIG. 2, left side hinge 24 includes a G-shaped bar structure 38 having a first end 40 that is secured (fixed) to the decklid panel 20, and a second end 41 that is pivotably connected to a bracket 42 of liftgate panel 10 by a hinge pin 44. A transverse portion 39 of bar structure 38 extends through an opening 43 of a wall structure 45 of liftgate panel 10. A first end 46 of powered actuator 22 is pivotably connected to transverse portion 39 of hinge 24, and second end 48 of powered actuator 22 is pivotally connected to liftgate panel 10.

Figure 3:
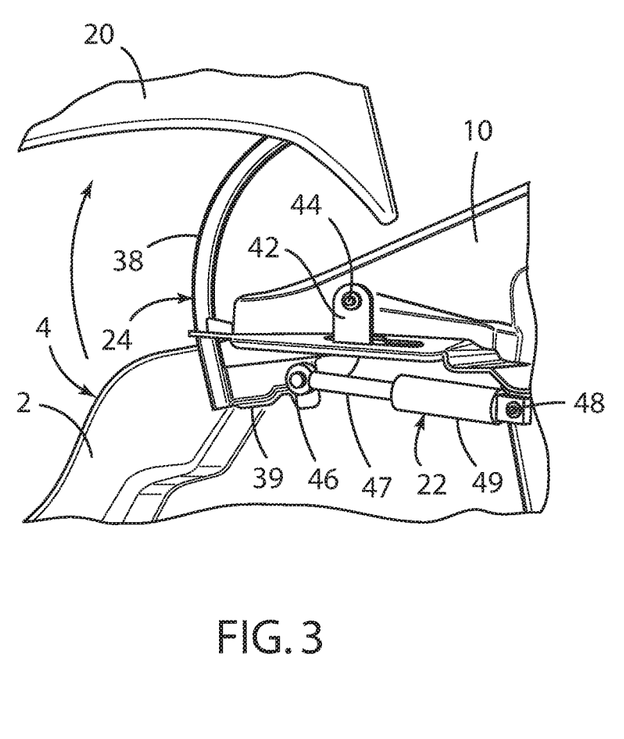
FIG. 3 is a partially fragmentary isometric view of the decklid panel in an open position.

With reference to FIGS. 3 and 4, powered actuator 22 can be actuated to thereby shift the decklid panel 20 from a closed position (FIGS. 1 and 2) to an open position (FIGS. 3 and 4). The powered actuators 12 and 22 may comprise electrically-powered struts of a known type that include a reversible electric motor (not shown) that causes a strut 47 (FIG. 3) to extend and retract from a body 49 of the powered actuator 22 upon actuation of the electric motor. The electric motor may be operably connected to a gear drive (not shown) such that the electric motor can be actuated to both open and close decklid panel 20 by extending and retracting strut 47 relative to body 49 of powered actuator 22. The gear drive may be configured such that forces on decklid panel 20 do not cause strut 47 to extend and retract relative to body 49. In this way, if electric power is not supplied to the powered actuator 22, the powered actuator 22 effectively locks the decklid panel 20 in position relative to liftgate panel 10. Thus, if no electric power is supplied to the powered actuator 22 when the decklid panel 20 is in a closed position (FIGS. 1 and 2), the powered actuator 22 locks the decklid panel 20 in a closed position relative to the liftgate panel 10.

The powered actuator 22, hinge 24, and other components shown in FIGS. 2 and 3 are positioned on a left hand side of vehicle 1. Corresponding mirror image components are preferably positioned on a right hand side of vehicle 1. Thus, the decklid panel 20 is preferably connected to liftgate panel 10 by a pair of hinges 24 and a pair of powered actuators 22 that can be actuated simultaneously.

Figure 5:
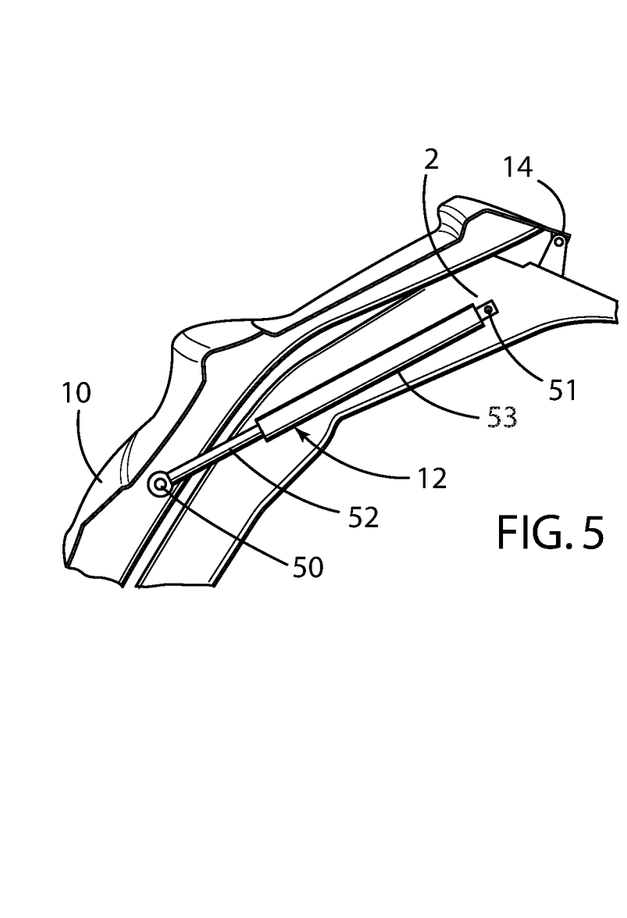
FIG. 5 is a partially fragmentary isometric view showing the liftgate panel of FIG. 1.

With further reference to FIGS. 5 and 6, first powered actuator 12 includes a first end 50 that is connected to liftgate panel 10, and a second end 51 that is pivotally connected to body structure 2. The powered actuator 12 includes a strut 52 and a body 53. Upon actuation of powered actuator 12, the strut 52 extends and retracts from body 53. The powered actuator 12 may be substantially similar to the powered actuator 22, and may include a reversible electric motor (not shown) and a gear drive (not shown) whereby the powered actuator 12 provides for powered opening and powered closing of liftgate panel 10 relative to vehicle body structure 2. The powered actuator 12 may be configured such that the strut 52 cannot be extended and retracted relative to body 53 if electrical power is not supplied to the strut 12. Thus, strut 12 may be configured to lock liftgate panel 10 in a closed position (FIGS. 4 and 5) if no electrical power is supplied to the powered actuator 12. The powered actuators 12 and 22 may include other locking arrangements (not shown) such as adjustable bumpers or stops that lock the powered actuators 12 and 22 to limit or prevent extension and/or retraction. The first hinge 14 may comprise a conventional hinge mechanism of the type utilized to rotatably connect liftgate panels to vehicle body structures. The powered actuator 12 and related components shown in FIGS. 5 and 6 are utilized on the left side of vehicle 1. A substantially identical mirror image arrangement including a powered actuator 12 is preferably utilized on the right side of the vehicle 1. Accordingly, liftgate panel 10 may be movably interconnected to vehicle body structure 2 by a pair of first hinges 14 and a pair of powered actuators 12 that can be simultaneously actuated.

During operation, a user can selectively open only decklid panel 20 as shown in FIG. 4. Alternatively, a user can open the liftgate panel 10 and decklid panel 20 together as a unit as shown in FIG. 7. The system (e.g. controller 28 and other related components) can be configured such that a user can selectively actuate the powered actuators 22 to open and close decklid panel 20 while liftgate panel 10 remains in a closed position. As discussed above, the first powered actuators 12 lock liftgate panel 10 in a closed position during actuation of second powered actuators 22. When the liftgate panel 10 and decklid panel 20 are in a closed position (FIG. 1) the powered actuators 12 and 22 may both be locked to thereby retain the liftgate panel 10 and decklid panel 20 in the closed position. The latch mechanism 26 further retains the liftgate panel 10 and decklid panel 20 in the closed position. Locking of powered actuators 12 and 22 when the liftgate panel 10 and decklid panel 20 are in the closed position (FIG. 1) reduces "chucking" or other movement of liftgate panel 10 and/or decklid panel 20 relative to body structure 2 that could otherwise occur when the liftgate panel 10 and decklid panel 20 are in the closed position.

Referring again to FIG. 7, a user can open liftgate panel 10 by actuating powered actuators 12 utilizing remote fob 32 (FIG. 1), or inputs 34 and 36. The controller 28 and other components may be configured such that the second powered actuators 22 remain locked when first powered actuators 12 are actuated to thereby prevent movement of decklid panel 20 relative to liftgate panel 10 as liftgate panel 10 opens and closes.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A dual closure system for non-convertible vehicles having fixed, non-movable roof structures, the dual closure system comprising:
   a liftgate panel having a first hinge that is configured to movably connect a front edge of the liftgate panel to a vehicle body adjacent a forward edge of a rearwardlyfacing access opening in the vehicle body, the liftgate panel including a rear edge that is opposite the front edge;
a decklid panel having a forward edge pivotably connected to the liftgate panel adjacent the rear edge of the liftgate panel by a lid hinge;
a first powered actuator configured to provide powered rotation of the liftgate panel in a first direction about the first hinge to simultaneously raise the rear edge of the liftgate panel and the forward edge of the decklid panel and open the liftgate panel, wherein the first powered actuator is also configured to provide powered rotation of the liftgate panel in a second direction about the first hinge to close the liftgate panel;
a second powered actuator configured to provide powered rotation of the decklid panel in a first direction about the lid hinge to open the decklid panel relative to the liftgate panel, wherein the second powered actuator is also configured to provide powered rotation of the decklid panel in a second direction about the lid hinge to close the decklid relative to the liftgate panel;
wherein the first powered actuator is configured to selectively lock the liftgate panel in a closed position about the first hinge when the second powered actuator is actuated to open the decklid; and
wherein the second powered actuator is configured to selectively lock the decklid panel in a closed position about the lid hinge when the first powered actuator is actuated to open the liftgate panel.

2. The dual closure system of claim 1, wherein:
the first powered actuator comprises a powered stmt that both extends and retracts upon actuation of the powered actuator.

3. The dual closure system of claim 2, wherein:
the powered strut includes a reversible electric motor that rotates in first and second opposite directions to extend and retract, respectively, the powered strut.

4. The dual closure system of claim 1, wherein:
the second powered actuator comprises a powered strut that both extends and retracts upon actuation of the powered actuator.

5. The dual closure system of claim 4, wherein:
the powered strut includes a reversible electric motor that rotates in first and second opposite directions to extend and retract, respectively, the powered strut.

6. The dual closure system of claim 1, wherein:
the decklid panel includes a latch that is configured to engage a vehicle body to retain the decklid panel and the liftgate panel in a closed position.

7. The dual closure system of claim 6, wherein:
the second powered actuator is further configured to lock the decklid panel in a closed position about the lid hinge when the latch engages a vehicle body.

8. The dual closure system of claim 1, including:
a stop including first and second stop surfaces that contact each other when the decklid panel is in a closed position relative to the liftgate panel to prevent rotation of the decklid panel in the second direction.

9. The dual closure system of claim 1, including:
a controller operably connected to the first and second powered actuators.

10. A vehicle closure, comprising:
a rotatable liftgate;
a decklid rotatably connected to the liftgate; and
first and second electrically powered actuators providing powered opening and powered closing of the liftgate and decklid, respectively, wherein the first powered actuator locks to prevent movement of the liftgate when the second powered actuator is actuated, and the second powered actuator locks to prevent movement of the decklid when the first powered actuator is actuated to open the liftgate.

11. The vehicle closure of claim 10, wherein:
the first and second electrically powered actuators comprise pairs of first and second struts, respectively, having reversible electric motors.

12. The vehicle closure of claim 11, wherein:
the first struts extend to provide powered opening of the liftgate, and retract to provide powered closing of the liftgate.

13. The vehicle closure of claim 11, wherein:
the first struts include adjustable stops that limit retraction of the first struts to lock the first struts.

14. The vehicle closure of claim 11, wherein:
the second struts extend to provide powered opening of the decklid relative to the liftgate, and retract to provide powered closing of the decklid relative to the liftgate.

15. The dual closure system of claim 4, wherein:
the second struts include adjustable stops that limit retraction of the second struts to lock the second struts.

16. A non-convertible vehicle, comprising:
a body structure having a fixed, non-movable roof structure having a rear edge extending above a rear access opening in the body structure;
a liftgate panel having a forward edge movably connected to the rear edge of the roof structure adjacent a forward portion of the access opening;
a decklid panel pivotably connected to the liftgate panel;
a first powered actuator providing powered rotation of the liftgate panel in a first direction to open the liftgate panel, wherein the first powered actuator is also configured to provide powered rotation of the liftgate panel in a second direction to close the liftgate panel; and
a second powered actuator providing powered rotation of the decklid panel in a first direction to open the decklid panel relative to the liftgate panel, wherein the second powered actuator also provides powered rotation of the decklid panel in a second direction to close the decklid relative to the liftgate panel;
wherein the first powered actuator is configured to selectively lock the liftgate panel in a closed position when the second powered actuator is actuated to open the decklid; and
wherein the second powered actuator is configured to selectively lock the decklid panel in a closed position when the first powered actuator is actuated to open the liftgate panel.

17. The non-convertible vehicle of claim 16, wherein:
the first powered actuator comprises a powered stmt that both extends and retracts upon actuation of the powered actuator.

18. The non-convertible vehicle of claim 17, wherein:
the powered strut comprises a pair of powered struts, each including a reversible electric motor that rotates in first and second opposite directions to simultaneously extend and retract, the powered struts.

19. The non-convertible vehicle of claim 16, wherein:
the second powered actuator comprises a pair of powered struts that extend and retract upon actuation of the powered actuators.

20. The non-convertible vehicle of claim 16, wherein:
the decklid panel includes a latch that is configured to engage a vehicle body to retain the decklid panel and the liftgate panel in a closed position; and wherein:

the second powered actuator is further configured to lock the decklid panel in a closed position when the latch engages a vehicle body.

* * * * *

UNITED STATES PATENT AND TRADEMARK OFFICE
CERTIFICATE OF CORRECTION

| | | |
|---|---|---|
| PATENT NO. | : 9,783,028 B1 | |
| APPLICATION NO. | : 15/071649 | |
| DATED | : October 10, 2017 | |
| INVENTOR(S) | : Papanikolaou et al. | |

It is certified that error appears in the above-identified patent and that said Letters Patent is hereby corrected as shown below:

In the Claims

Column 5;
Claim 2, Line 3;
"stmt" should be --strut--.

Column 6;
Claim 17, Line 52;
"stmt" should be --strut--.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*